United States Patent [19]
Knox

[11] 3,732,431
[45] May 8, 1973

[54] PULSE GENERATOR
[75] Inventor: Frank P. Knox, Bloomfield, Conn.
[73] Assignee: Veeder Industries Inc., Hartford, Conn.
[22] Filed: Sept. 27, 1971
[21] Appl. No.: 184,067

[52] U.S. Cl. .....................307/106, 73/519, 324/174
[51] Int. Cl. ................................................G01p 3/48
[58] Field of Search ................73/518, 519, DIG. 3; 324/70, 168, 171, 174; 307/106; 335/56, 92, 97

[56] References Cited
UNITED STATES PATENTS 2,872,597   2/1959   Ormond ..........................324/168 X
3,144,533   8/1964   Donath...................................335/56

FOREIGN PATENTS OR APPLICATIONS 893,986   4/1962   Great Britain........................324/174

Primary Examiner—Robert K. Schaefer
Assistant Examiner—William J. Smith
Attorney—John M. Prutzman et al.

[57] ABSTRACT

A pulse generator having a rotor with a pair of axially spaced coaxial magnet rings and a switch mounted between the spaced magnet rings having a pair of spaced fixed contacts and a shuttle reciprocable between the fixed contacts and magnetically operated back and forth by the rotor for generating an electrical signal for each predetermined angular increment of displacement of the rotor.

2 Claims, 6 Drawing Figures

PATENTED MAY 8 1973
3,732,431
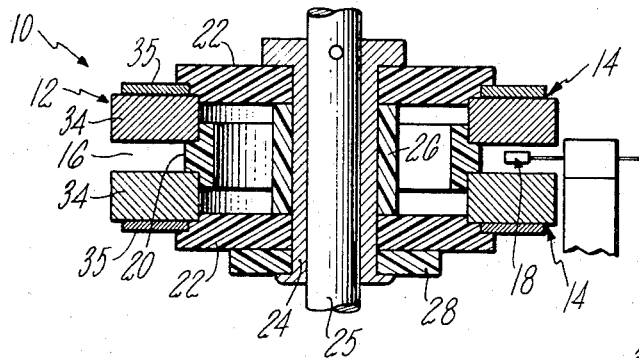
FIG. 1
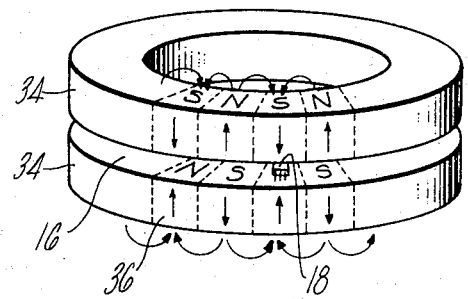
FIG. 2
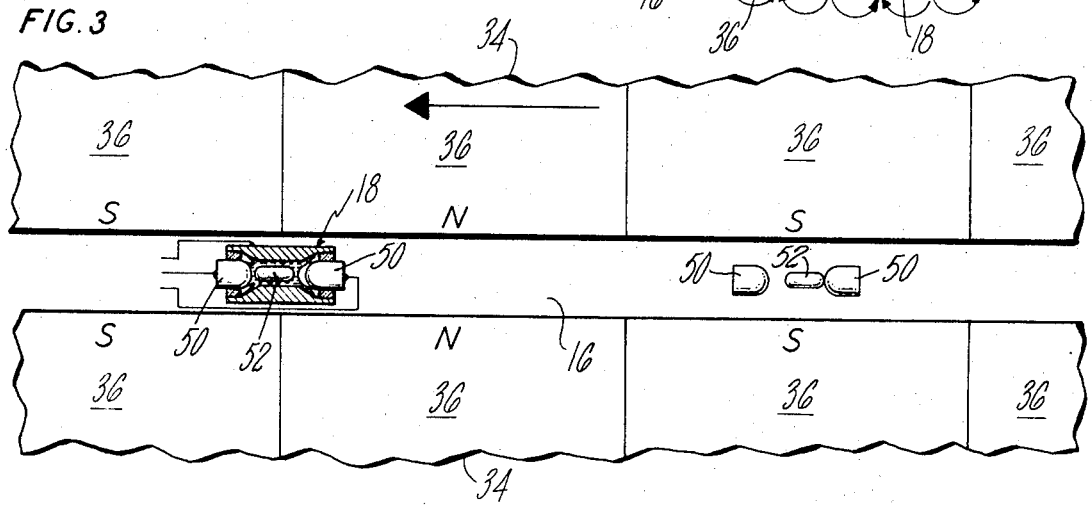
FIG. 3
FIG 5a
SWITCH A
SWITCH B
COMBINED OUTPUT
FIG 5b
SWITCH A
SWITCH B
COMBINED OUTPUT
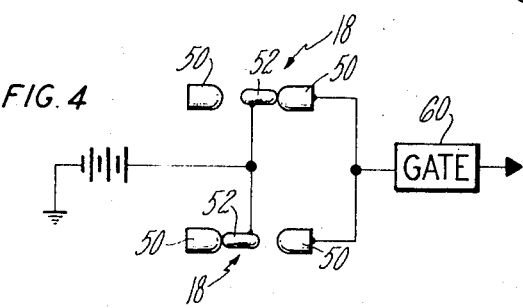
FIG. 4
INVENTOR
FRANK P. KNOX
BY Ralph H. Chilton
ATTORNEY

PULSE GENERATOR

BRIEF SUMMARY OF THE INVENTION

The present invention generally relates to relative displacement pulse generators operable for generating a train of electrical pulses or signals in accordance with the relative displacement of relatively movable parts.

It is a principal aim of the present invention to provide a new and improved rotary pulse generator operable for producing an electrical signal for each predetermined increment of angular displacement of its rotary input.

It is another aim of the present invention to provide a new and improved relative displacement pulse generator operable to produce an electrical signal for each predetermined increment of relative displacement of the parts irrespective of their rate of relative movement.

It is another aim of the present invention to provide a new and improved relative displacement pulse generator useful in determining the relative position of relatively movable parts.

It is a further aim of the present invention to provide a new and improved relative displacement pulse generator employing a magnetically operated shuttle type switch as a pickup for sensing the relative displacement of relatively movable parts.

It is another aim of the present invention to provide a new and improved relative displacement pulse generator for generating a signal for each predetermined very small relative displacement of two relatively movable parts.

It is a further aim of the present invention to provide a new and improved pulse generator useful in fluid dispensing apparatus in combination with a fluid meter for generating a pulse train with a pulse for each predetermined increment of fluid dispensed.

Other objects will be in part obvious and in part pointed out more in detail hereinafter.

A better understanding of the invention will be obtained from the following detailed description and the accompanying drawing showing illustrative applications of the invention.

BRIEF DESCRIPTION OF THE DRAWING

In the drawing:

FIG. 1 is a section view, partly broken away and partly in section, of a pulse generator incorporating an embodiment of the present invention;

FIG. 2 is a reduced perspective view of a pair of rotor permanent magnets and a magnetically operated pickup of the pulse generator and illustrating the magnetism of the permanent magnets;

FIG. 3 is an enlarged partial layout, view partly broken away and partly in section of the pulse generator and schematically showing an additional pickup;

FIG. 4 is a schematic view of an output circuit of a pulse generator incorporating a pair of pickups; and FIGS. 5a and 5b illustrate the relationship of the electrical signals produced by each of the pair of pickups and by the output circuit with the pulse generator rotor rotated in opposite directions.

DESCRIPTION OF THE PREFERRED EMBODIMENTS

Referring now to the drawing in detail wherein like numerals represent like parts throughout the several figures, an embodiment 10 of a pulse generator incorporating the present invention is shown comprising a rotor 12 having a pair of axially spaced coaxial ring magnets 14 with an annular air gap 16 therebetween and a magnetically operated pickup or switch 18 mounted in the air gap for operation by the rotor 12 to produce an electrical signal or pulse upon each predetermined increment of angular displacement of the rotor.

The rotor 12 comprises a plastic annular spacer 20 between the ring magnets 14, a pair of aluminum or plastic end plates 22 for mounting the ring magnets 14 coaxially on a rotor hub 24 and a rotor drive shaft 25. A plastic spacer sleeve 26 is mounted on the hub 24 between the end plates 22 and a plastic washer 28 is mounted on the hub and the end of the hub is flared outwardly against the washer 28 to secure the rotor parts together.

Each ring magnet 14 comprises an annular permanent magnet 34 having an even number (e.g. 24) of equiangularly spaced axially extending individual permanent magnets 36 and an outer ring or cap 35 of ferromagnetic material for reducing the reluctance between the outer axial faces of adjacent individual magnets 36. The annular permanent magnets 34 are oriented so that their opposed individual magnets 36 are in substantial axial alignment and so that the alternating poles of each magnet are substantially directly opposed to like poles of the other magnet. As a result, the annular magnets 34 are oriented such that the air gap magnetic field of each annular magnet 34 is in effect "compressed" by the magnetic field of the other annular magnet 34, it being understood that the air gap magnetic field of each ring magnet 34 is also dependent on the magnetic characteristics of the individual permanent magnets 36, the pole pitch and the width of the air gap 16.

The pickup or switch 18 shown is a bistable switch of the type disclosed in U. S. Pat. No. 3,144,533 of Edwin Donath entitled "Mercury Relay" and comprises a pair of fixed end contacts 50 and a movable contact or shuttle 52 shiftable back and forth between the end contacts 50. As described in more detail in said U. S. Pat. No. 3,144,533 the shuttle 52 is mounted in mercury and such that the shuttle 52 functions as an overcenter switch and is adapted to be held in electrical connection with each end contact 50 by the surface tension of the mercury. The shuttle is extremely short (e.g. about 100 mils) and the length of the switch 18 is substantially less than the pole pitch of the individual ring magnets 36.

The switch 18 is mounted in the air gap 16 preferably substantially midway between the spaced ring magnets 14 and with its longitudinal axis extending tangentially and such that as the rotor 12 rotates the switch 18 is effected substantially equally by the magnetic fields produced by the opposed ring magnets 14. The shuttle 52 is made wholly or partially of ferromagnetic material (e.g. soft iron) so that it can be magnetically shifted back and forth between the end contacts 50. The end contacts are also preferably wholly or partially ferromagnetic to provide for more effective magnetic operation of the shuttle and for overcenter magnetic operation of the shuttle (in addition to the overcenter operation of the shuttle provided by the surface tension of the mercury in which the shuttle is immersed).

As the rotor 12 rotates the shuttle 52 is actuated back and forth between the contacts 50 due to the application of the varying magnetic field on the switch shuttle 52 and end contacts 50. More particularly, when the magnetic field intensity between the shuttle and open contact 50 is greater than the magnetic field intensity between the shuttle and the closed contact 50, the shuttle will be shifted by the magnetic field to close the previously open contact 50. As the rotor 12 rotates the air gap magnetic field will provide for cycling the shuttle once for each angular increment of rotation of the rotor equivalent to the angular pole pitch. Also, it has been found that the angular increment during which the leading and trailing contacts 50 are closed may be substantially different and that the leading contact 50 (i.e. the contact 50 affected first by the rotating magnetic field) may be closed for an angular increment of substantially less than one-half an operating cycle (e.g. approximately one-fourth of the operating cycle) and the trailing contact may be closed for substantially greater than one-half the operating cycle (i.e. three-fourths of the operating cycle). The operative angular increments during which leading and trailing contacts are closed are a function of the magnetic characteristics of the ring magnets 14, pole pitch, air gap width, shuttle length and shuttle displacement. In general, the shuttle 52 will be shifted into engagement with the leading contact 50 as the switch approaches the center line of each pair of opposed magnets 36 and will be shifted back into engagement with the trailing contact 50 shortly after the switch passes the magnet center line. This is believed due in part to the substantially greater field intensity through the end contact 50 nearer the center line of the opposed magnets. The actual angular increment during which the leading end contact 50 is closed is, of course, dependent on the actual magnetic field applied to the switch 18 and dependent on the variation in the magnetic field intensity applied to switch may be approximately one-half of the switch operating cycle.

As shown in FIG. 3, the pulse generator may employ a pair of angularly spaced switches 18 which are operationally offset, for example by an angle equal to one-half the angular pole pitch. Thus, as shown in FIG. 5a the two switches 18 (designated A and B in FIG. 5a) may by used to generate relatively short equally spaced non-overlapping signals with the leading end contacts 50 of the switch and such that the leading end contacts 50 can be connected in parallel (as shown in FIG. 4) to provide a combined output (shown in FIG. 5a) of evenly spaced pulses.

If the rotor 12 is rotated in the reverse angular direction the end contacts 50 will thereupon become trailing contacts and will generate relatively long overlapping signals as shown in FIG. 5b. Referring to FIG. 4 the corresponding end contacts 50 of the pair of switches 18 may be connected to a suitable gate circuit 60 to provide a combined output which is free of pulses (as shown in FIG 5b) when the rotor is driven in such reverse angular direction where the operative and contacts 50 are trailing contacts (and a non-pulsating constant voltage input is therefore applied to the gate 60) and to provide a combined output with spaced pulses when the rotor is rotated in the opposite direction (when a pulsating voltage input is applied to the gate 60). Accordingly, the pulse generator can be employed as a unidirectional pulse generator operative to generate pulses when driven in one direction only.

The pulse generator switch 18 may also have both of its contacts 50 connected in parallel and to a suitable gate (not shown) to provide for generating very short pulses during the contact "break" interval, in which case a switch 18 providing a "break before make" motion would be employed. Also a monostable shuttle switch as disclosed in the aforementioned U.S. Pat. No. 3,144,533 could be employed in lieu of a bistable shuttle switch in order to modify the closure time of the operative end contact of the switch.

As will be apparent to persons skilled in the art, various modifications, adaptations and variations of the foregoing specific disclosure can be made without departing from the teachings of the present invention.

I claim:

1. A pulse generator comprising magnet means having two spaced rows of opposed magnetic poles extending along a predetermined path and producing a varying magnetic field therebetween and switch means between the spaced rows of magnetic poles comprising a first magnetically operated switch having a fixed contact and a reciprocable shuttle magnetically operable back and forth for respectively making and breaking electrical connection with the fixed contact, the switch means and rows of opposed magnetic poles being mounted for relative movement along said predetermined path and such that the varying magnetic field is applied to the switch to reciprocate the shuttle back and forth to generate a train of electrical signals in accordance with the relative displacement of the switch means and rows of magnetic poles along said path, the magnetic poles of each row being substantially equally spaced along said predetermined path and such that an electrical signal is produced for substantially each predetermined increment of relative displacement of the switch and rows of magnetic poles along said path, the switch means comprising a second said magnetically operated switch spaced from said first switch such that upon said relative movement of the switch means and the rows of magnetic poles, the shuttles of the first and second switches are magnetically operated to reciprocate back and forth at different times.

2. A pulse generator according to claim 1 wherein the opposed magnetic poles are oriented for operating the switch shuttles for making said electrical connection for substantially less than one-half the switch cycle upon said relative movement in one direction and for substantially more than the one-half the switch cycle upon said relative movement in the opposite direction and wherein the switch contacts are interconnected for providing a train of spaced electrical signals upon said relative movement in said one direction and overlapping electrical signals upon said relative movement in said opposite direction.

* * * * *